United States Patent
Preston

(10) Patent No.: US 6,883,756 B2
(45) Date of Patent: Apr. 26, 2005

(54) METHOD AND APPARATUS FOR DELAYED PARACHUTE DEPLOYMENT

(75) Inventor: Daniel Preston, Kew Gardens, NY (US)

(73) Assignee: Atair Aerospace, Inc., Brooklyn, NY (US)

( * ) Notice: Subject to any disclaimer, the term of this patent is extended or adjusted under 35 U.S.C. 154(b) by 0 days.

(21) Appl. No.: 10/442,812

(22) Filed: May 21, 2003

(65) Prior Publication Data

US 2003/0218100 A1 Nov. 27, 2003

Related U.S. Application Data

(60) Provisional application No. 60/382,919, filed on May 21, 2002.

(51) Int. Cl.[7] .................. B64D 17/58; B64D 17/54; B64D 17/64
(52) U.S. Cl. ........................ 244/150; 244/149
(58) Field of Search ............... 244/150, 151 R, 244/151 A, 151 B, 142, 147, 148, 149

(56) References Cited

U.S. PATENT DOCUMENTS

| | | | | |
|---|---|---|---|---|
| 2,606,729 A | * | 8/1952 | Frieder et al. | 244/150 |
| 2,972,458 A | * | 2/1961 | Sepp, Jr. | 244/147 |
| 3,278,142 A | * | 10/1966 | Marshall | 244/149 |
| 3,393,001 A | * | 7/1968 | Beckwith, Jr. | 294/82.25 |
| 3,759,469 A | * | 9/1973 | Nimylowycz | 244/149 |
| 3,776,493 A | * | 12/1973 | Matsuo | 244/147 |
| 3,787,011 A | * | 1/1974 | Phillips et al. | 244/150 |
| 3,801,051 A | * | 4/1974 | Hosterman et al. | 244/137.3 |
| 3,829,046 A | * | 8/1974 | Matsuo et al. | 244/152 |
| 4,108,402 A | * | 8/1978 | Bowen | 244/139 |
| 4,279,392 A | * | 7/1981 | Saxton | 244/150 |
| 4,480,806 A | * | 11/1984 | Duncan | 244/122 A |
| 5,058,831 A | * | 10/1991 | Takahashi | 244/142 |
| 5,104,066 A | * | 4/1992 | Aronne | 244/122 AE |
| 5,232,184 A | * | 8/1993 | Reuter | 244/147 |
| 5,687,931 A | * | 11/1997 | Hogan | 244/151 B |
| 5,899,415 A | * | 5/1999 | Conway et al. | 244/152 |
| 6,705,572 B1 | * | 3/2004 | Christopher | 244/142 |
| 6,805,323 B1 | * | 10/2004 | Preston | 244/142 |
| 2003/0197095 A1 | * | 10/2003 | Preston | 244/152 |
| 2004/0026569 A1 | * | 2/2004 | Preston | 244/147 |

* cited by examiner

Primary Examiner—Michael J. Carone
Assistant Examiner—James S. Bergin
(74) Attorney, Agent, or Firm—Bourque & Associates, P.A.

(57) ABSTRACT

A hydraulic mechanism is positioned within the drogue bridle of a parachute system. The hydraulic link is slowly moved by tension on the drogue bridle to operate a release. The release operates to release the drogue chute and to deploy the main chute. The movement of the hydraulic link provides a time delay between deployment of the drogue chute and the main chute to allow the load to stabilize before deployment of the main chute.

14 Claims, 1 Drawing Sheet

METHOD AND APPARATUS FOR DELAYED PARACHUTE DEPLOYMENT

This application claims benefits of 60/382,919 May 21, 2002.

BACKGROUND OF THE INVENTION

1. Field of the Invention

The present invention relates to release systems for parachutes systems including a drogue or pilot chute. More particularly it relates to a parachute release system for proper sequencing and timing of chute deployment.

2. Discussion of Related Art

Use of Drogue systems are known and used to stabilize loads under a small chute before deployment of a larger main chute. Such systems are typically used for cargo drops or tandem skydiving. Drogues ensure the system is stable and falling at the proper speed for deployment of the main chute. For tandem skydiving, the parachutist deploys the drogue chute first. Once the pair has stabilized and reached the proper altitude, the parachutist manually releases the drogue which then pulls out the main chute. For cargo drops, the drogue chute typically is released upon discharge of the cargo from the deploying aircraft by static line and then a short time delay is created by using a 'double bag system'. This is basically where the pilot chute immediately deploys the main but is connected to the slider through a hole in the top of the parachute. The tension on the pilot bridal prevents the slider from opening immediately and delays the opening slightly. An alternate method used is an electronic circuit connected to an actuator that releases the drogue or a mechanical timer with actuator. Both such methods are typically cost prohibitive. Therefore, a need exists for a mechanism to provide a delay between deployment of the drogue and the main chute.

SUMMARY OF THE INVENTION

The present invention includes hydraulic link in the drogue bridle between the drogue chute and the main chute of a parachute system. Tension on the drogue bridle causes a piston in the hydraulic link to move within the cylinder. The rate of movement is controlled by the fluid return path between chambers of the cylinder. According to an aspect of the invention, the return path is adjustable or preset during manufacture to control the rate of movement of the piston. At the end of the piston stroke, the rod end retracts to trip a web release, i.e. a 3-ring release. The web release and hydraulic timer or manual pull provides a "tension bridge" and a slack portion termed the "slack loop" is provided about the tension bridge. This slack loop is connected to the main pin of the parachute container. Under tension, force is transmitted from the drogue down the bridal through the web release into the container. When the tension bridge is severed (web release tripped), tension now routes through the slack loop, thus extracting the main pin and opening the main container and deploying the parachute. According to another aspect of the invention, the web release is a sacrificial link, i.e. a loop of spectra line, which is severed by the end motion of the hydraulic timer. A key benefit of this invention over the prior art is that the tension on the bridal is used to power the timer and then to extract the main pin. This ensures two benefits, first it prevents an out of sequence deployment: the main can not deploy before the drogue as the main pin can only be extracted by drogue bridal tension (this prevents the most common forms of malfunction). And second, the force on the drogue is typically ½ the suspended system weight. With increasing weight prior art systems have the same or less force to pull the main pin, but as suspended weight increases so does the pin pull force. By using the tension energy in the drogue bridal to extract the pin you overcome small actuator or human strength limitations. Available force on the drogue bridal has been measured by us on various systems at ten (10) to forty-eight (48) times more than required to extract the pin, making the system quite fail safe.

DETAILED DESCRIPTION

Figure 1:
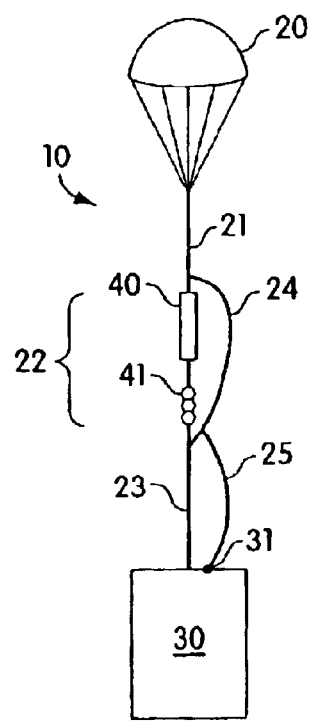
FIG. 1 illustrates a parachute system according to an embodiment of the present invention.

FIG. 1 illustrates a parachute system 10 including a drogue or pilot chute 20 and a main chute 30 according to an embodiment of the present invention. The parachute system 10 of the present invention is designed for use with dropping cargo. However, it may also be used for manned parachute systems, either individual or tandem systems (in the version to be used in a manned tandem situation the hydraulic timer is replaced by a pull cord to be actuated manually by the parachutist, the tension bridge/slack loop mechanism remains). Additionally, the drogue and main chutes may be of any known type, including round or ram air canopies. The parachute system 10 of the present invention provides a delay between deployment of a drogue chute and the main chute. The delay allows the load to stabilize under the drogue chute before the main chute is deployed. The delay is provided by a unique bridle system for the drogue chute. The bridle system includes an upper bridle 21 connected to the drogue 20, a lower bridle 23 connected to the main chute 30, and a delay link between the upper 21 and lower bridles 23 providing a 'tension bridge' 22 incorporating a web release 41 and a hydraulic timer 40 (unmanned) or pull cable (manned). A 'Slack Loop' 24, 25 is formed by the bridged portion of the bridal which is connected to the main pin 31 for deploying the main parachute. The slack loop 24, 25 does not have tension on it until the tension bridge 22 is severed. When tensioned, the slack loop 24, 25 extracts the main pin 31 deploying the main parachute. According to an embodiment of the invention, the release 41 includes any web release known in the art i.e. a 3-ring release. Alternatively, the release 41 may include a sacrificial link and a cutter (not shown).

Figure 2:
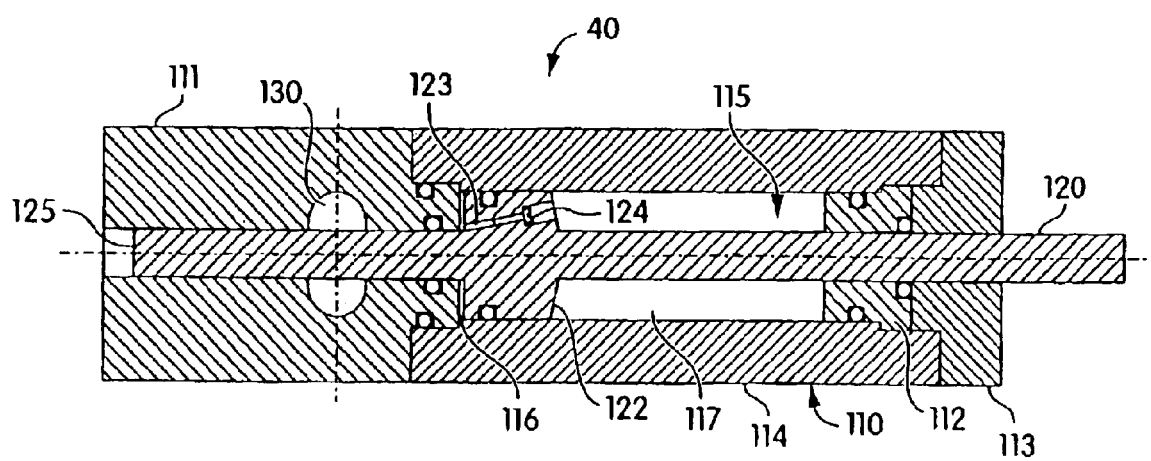
FIG. 2 is a cross sectional view of an hydraulic link according to an embodiment of the present invention.

An embodiment of the hydraulic link 40 is illustrated in FIG. 2. The hydraulic link 40 includes a body 110 and a piston 120. As illustrated in FIG. 2, the body 110 includes a release portion 111, a cylinder portion 114, and two end portions 112, 113. The release portion 111 and two end portions 112, 113 seal the cylinder portion 114 to create a chamber 115 which is filled with fluid. Appropriate seals are used to property seal the body 110 and the piston 120. The piston 120 includes a rod 121 and a divider 122. The divider 122 is disposed in the cylinder portion 112 of the body 110. The divider 122 separates the chamber 115 into two sub-chambers 116, 117. The divider 122 and cylinder portion 112 are sealed so that the sole connection between the two sub-chambers 115, 116 is a fluid path 123 created in the divider 122. A set screw 124 is disposed in the divider 122 such that it extends into the fluid path 123. The set screw 124 allows the cross-sectional area of the fluid path 123 to be adjusted.

The hydraulic link 40 is disposed in the drogue bridle such that the body 110 and piston 120 are attached to opposite parts of the bridle in the tension bridge. When the drogue bridle is tensioned, upon deployment of the drogue chute, the piston 120 moves within the body 110 of the hydraulic link. As the piston 120 moves, fluid in the chamber 115 passes through the fluid path 123 from the first sub-chamber 116 to the second chamber 117. The conductance of the fluid path 123 and the viscosity of the fluid determine the 5 time it will take for movement of the piston 120. The rate of motion of the piston 120 is not dependent on the degree of tension on the bridle, as fluid can not travel supersonic through an orifice as any additional force over a point will not result in faster fluid flow. The set screw 124 can be used to adjust the cross sectional area of the fluid path 123 to control the rate of movement.

The release portion 111 of the body 110 includes a release slot 130. An engagement end 125 of the piston 120 extends through the release slot when the piston 120 is in an engaged position. When the piston 120 moves to a disengaged position, the engagement end 125 no longer extends through the release slot 130. To set the hydraulic link, a loop of string (not shown) on the release 41 is placed in the release slot 130. The piston 120 is moved into the engaged position so that the engagement end 125 extends through the release slot 130 and retains the loop of string to trigger a 3 ring web release within the release slot 130. The parachute system is packed in an ordinary manner. Upon deployment, the drogue chute is initially deployed. As the drogue chute is deployed, tension on the drogue bridle begins moving the piston 120 within the hydraulic link 40. The piston moves slowly to the disengaged position. When it reaches the disengaged position, the loop of string is released by withdrawal of the engagement end 125. Releasing the loop of string operates the 3 ring release 41 to release the tension bridge and put tension on the slack loop thus extracting the main pin and deploy the main chute. The time required to move the piston from the engaged position to the disengaged position allows the load to stabilize under the drogue chute prior to deployment of the main chute. Use of the bridal tension to extract the main pin prevents an out of sequence deployment malfunction and ensures sufficient force to extract the main pin, eliminating two common malfunctions. Other mechanisms can be used to operate the release 41 in place of the loop of string held in a release slot by the piston. Movement of the piston may also activate a cutter to sever a sacrificial link.

The parachute system of the present invention is particularly useful for cargo drops both tethered tandem (manned) and unmanned. For unmanned operation, the drogue chute is deployed upon discharge of the cargo from the aircraft in a known manner. The hydraulic timer provides a time delay between deployment of the drogue chute and the main chute. During this time delay, the cargo moves out of the burble of the aircraft and stabilizes under the drogue chute. Upon completion of the time delay, the release 41 operates to release the drogue chute and to deploy the main chute automatically. For manned operation, a parachutist loaded with cargo exits the aircraft and a drogue chute is deployed in a known manner. Once stable and at the correct altitude the parachutist pulls a cable connected in place of the hydraulic timer to trip the web release 41 on the tension bridge 22.

While the present inventions have been described with a certain degree of particularity, it is obvious from the foregoing detailed description that one skilled in the art may make one or more modifications which are suggested by the above descriptions of the novel embodiments.

What is claimed is:

1. A parachute system comprising:
   a drogue chute;
   a main chute; and
   a hydraulic timer delayed release for deploying the main chute a predetermined period of time after deployment of the drogue chute.

2. The parachute system of claim 1, further comprising a drogue bridle connecting the drogue chute to the main chute, and wherein the time delayed release is powered by the tension on the drogue bridle.

3. The parachute system of claim 2, wherein the hydraulic timer delayed release includes:
   a hydraulic link positioned in the drogue bridle which moves from an engaged position to a disengaged position under tension of the drogue bridle, and
   a release mechanism operable by the hydraulic link being moved into the disengaged position.

4. The parachute system of claim 3, wherein the release mechanism includes a three ring release.

5. The parachute system of claim 3, wherein the release mechanism includes a sacrificial link and a cutter.

6. The parachute system of claim 3, wherein the hydraulic link includes a body and a piston movable within the body between the engaged position and the disengaged position, and wherein the piston retains triggers the release mechanism when at the end of its stroke.

7. The parachute system of claim 6, wherein the hydraulic link includes fluid in the body, and a fluid path connected to the piston to control a rate of movement of the piston within the body.

8. The parachute system of claim 7, wherein the fluid path is adjustable in conductance such that the rate of movement of the piston can be changed.

9. The parachute system of claim 7, wherein the hydraulic link further comprises a set screw adjustably extending into the fluid path to impede the flow of fluid through the fluid path or an external fluid flow path with a variable conductance valve.

10. A method of deploying chutes in a parachute system having a drogue chute and a main chute, the method comprising the steps of:
    deploying the drogue chute;
    delaying a predetermined period of time using an hydraulic timer; and
    deploying the main chute after the predetermined period of time using a release operated by the hydraulic timer.

11. The method of deploying chutes in a parachute system according to claim 10, wherein the delaying step includes operating a hydraulic link in a bridle of the drogue chute to provide the predetermined period of time.

12. The method of deploying chutes in a parachute system according to claim 11, wherein the main chute deploying step includes using a three ring release mechanism operated when a piston of the hydraulic link reaches a disengaged position.

13. The method of deploying chutes in a parachute system according to claim 10, wherein the predetermined period of time is based upon tension on a bridle of the drogue chute.

14. A parachute system comprising:
    a drogue chute;
    a main chute;
    a bridle, connecting the drogue chute to the main chute;
    a hydraulic timer delayed release, for deploying the main chute a predetermined period of time after deployment of the drogue chute, and wherein the hydraulic timer delayed release is actuated by the tension on the bridle, and wherein the hydraulic timer delayed release includes a hydraulic link positioned in the bridle which moves from an engaged position to a disengaged position under tension of the bridle; and a release mechanism operable by the hydraulic link being moved into the disengaged position, for deploying said main chute.

* * * * *